United States Patent [19]

Henton

[11] Patent Number: 4,801,646

[45] Date of Patent: Jan. 31, 1989

[54] LOW GLOSS WEATHER AND IMPACT RESISTANT RESINS

[75] Inventor: David E. Henton, Midland, Mich.

[73] Assignee: The Dow Chemical Company, Midland, Mich.

[21] Appl. No.: 4,394

[22] Filed: Jan. 16, 1987

[51] Int. Cl.$^4$ .................. C08L 13/00; C08L 51/04; C08L 25/12; C08L 33/08

[52] U.S. Cl. ........................................ 525/71; 525/75; 525/81; 525/82; 525/85; 525/304; 525/305; 525/309; 525/308; 525/902

[58] Field of Search .................. 525/902, 85, 308, 309, 525/71, 75

[56] References Cited

U.S. PATENT DOCUMENTS

| | | |
|---|---|---|
| 3,661,994 | 5/1972 | Hwa et al. . |
| 3,671,607 | 6/1972 | Lee ........................................ 525/84 |
| 3,830,878 | 8/1974 | Kato et al. ............................ 525/902 |
| 3,944,631 | 3/1976 | Yu et al. ............................... 525/308 |
| 3,992,485 | 11/1976 | Kosugi et al. ........................ 525/308 |
| 4,387,138 | 6/1983 | Gift ...................................... 525/902 |
| 4,442,263 | 4/1984 | Branstetter et al. . |
| 4,456,734 | 6/1984 | Lindner et al. . |
| 4,508,875 | 2/1985 | Kishida et al. ....................... 525/902 |

FOREIGN PATENT DOCUMENTS 1124911 8/1968 United Kingdom .

*Primary Examiner*—Carman J. Seccuro

[57] ABSTRACT

Low gloss impact and weather resistant thermoplastic resins comprising a hard matrix polymer and a grafted alkylacrylate rubber having a core of a substantially uncrosslinked alkylacrylate polymer and a graftable overpolymer layer of a high crosslink density alkylacrylate polymer.

8 Claims, No Drawings

LOW GLOSS WEATHER AND IMPACT RESISTANT RESINS

BACKGROUND OF THE INVENTION

The present invention relates to an impact and weather resistant thermoplastic molding material comprising a blend of a polyacrylate rubber graft copolymer and a compatible rigid phase. More particularly, the present invention relates to such an impact and weather resistant thermoplastic molding material, wherein the polyacrylate rubber grafting base comprises a low gel, high swelling index butylacrylate rubber grafted with a rigid phase polymer.

It is previously known to prepare acrylate rubber polymers comprising homopolymers and copolymers of at least one alkyl acrylate having grafted thereto a suitable rigid phase. Preferred acrylate rubber particles comprise homopolymers of butylacrylate grafted with homopolymers of styrene or methylmethacrylate or copolymers of styrene with methylmethacrylate or acrylonitrile or both methylmethacrylate and acrylonitrile. Previously known weatherable resins modified by addition of the aforementioned butylacrylate containing rubbers have provided good physical properties and weather resistance, but generally have resulted in medium to high gloss articles under typical injection molding or extrusion conditions. For many applications, such as the interiors of automobiles and the like, it would be desirable to provide a weather resistant resin having a low gloss or "satin" surface appearance. Accordingly, it is to the attainment of this purpose, that the present invention is directed.

The preparation of impact resistant thermoplastic materials by mixing a hard component (a), comprising a copolymer styrene and acrylonitrile, with a soft component (b), comprising a graft copolymer of a styrene/acrylonitrile mixture onto a polyacrylate, has been disclosed in GB 1,124,911. Such molding materials are generically referred to as ASA polymers.

Numerous modifications and improvements in such ASA polymers have been developed. Suitable processes for the preparation of such improved ASA materials include those disclosed in U.S. Pat. Nos. 4,442,263; 4,456,734; 3,830,878; and 3,661,994. The teachings of the above described United States Patents are herein incorporated in their entirety by reference thereto.

SUMMARY OF THE INVENTION

According to the present invention, there is now provided an impact and weather resistant thermoplastic resin comprising: (a) a hard matrix polymer comprising polystyrene: polymethylmethacrylate: an addition polymer of two or more monomers selected from the group consisting of styrene, acrylonitrile, α-methylstyrene and methylmethacrylate; or mixtures thereof, and (b) a grafted alkylacrylate rubber comprising a rubber having a core of a substantially uncrosslinked alkylacrylate polymer having a Tg less than about 0° C., a swelling index in methyl ethyl ketone of greater than about 15, a gel content in methyl ethyl ketone of less than about 85 weight percent, and a graftable overpolymer layer of a high crosslink-density alkylacrylate polymer, said rubber having grafted thereto polystyrene; polymethylmethacrylate: an addition polymer of two or more monomers selected from the group consisting of styrene, α-methylstyrene, acrylonitrile and methylmethacrylate: or mixtures thereof.

DETAILED DESCRIPTION OF THE INVENTION

The hard matrix polymer component of the present invented thermoplastic resins are well known to the skilled artisan. Preferred hard polymers are those well known thermoplastic resins used in injection molded applications. A particular preferred hard matrix polymer is styrene/acrylonitrile copolymer. The hard matrix polymer may be prepared by any suitable polymerization technique including emulsion, mass, solution, or suspension polymerization techniques, or a combination thereof.

The grafted alkyl acrylate rubber is suitably prepared by emulsion polymerization techniques utilizing equipment and processing conditions well known to the skilled artisan. The core rubber is first prepared by polymerizing a suitable alkyl acrylate, optionally in combination with a minor amount, i.e., up to about 20 percent by weight of a copolymerizable comonomer. Suitable alkyl acrylate monomers include the $C_{1-8}$ alkyl acrylates. A particularly preferred alkyl acrylate monomer is butyl acrylate. Suitable copolymerizable comonomers include ethylenically unsaturated carboxylic acids and esters thereof having from about 3 to about 10 carbons and monovinylidene aromatic monomers. Preferably, the core consists essentially of polymerized alkyl acrylate monomer.

In the emulsion polymerization, a suitable seed latex may be employed to achieve uniform latex particle size. Such seed latexes preferably are alkyl acrylate homopolymers. Desirably, no polyfunctional crosslinkable monomer is intentionally added to the polymerization process, thereby achieving a substantially uncrosslinked alkyl acrylate core polymer rubber, however up to about 0.05 percent crosslinker can be added without significantly affecting the desired low gloss property of the present invention. Suitably, the core polymer has a particle size from about 0.05 to about 0.8 microns.

Once the core polymer is prepared, the graftable overpolymer layer is added by polymerization of an additional quantity of an alkyl acrylate monomer and a crosslinking or graftlinking comonomer. Suitable amounts of crosslinking or graftlinking comonomers are from about 0.1 to about 10 percent by weight.

Suitable crosslinking monomers are polyfunctional monomers that are well known in the prior art. Particularly preferred polyfunctional monomers are graftlinking divinyl-substituted monomers, wherein one or more of the vinyl groups is an allyl group or where one group is more reactive than the other under the polymerization conditions employed and a small portion of unreacted vinyl functionality remains after polymerization of the overpolymer layer as an aid to attaining graftlinking efficiency. Examples of suitable crosslinking monomers include divinylbenzene, trimethylolpropane triacrylate, trimethylolpropane trimethacrylate, mono-, di-, or polyalkylene- or polycycloalkylene glycol acrylates and methacrylates, butylene glycol diacrylate, butylene glycol dimethacrylate, etc.

Examples of suitable graftlinking monomers include allylacrylate, allylmethacrylate, diallylmaleate, diallylphthalate, triallyl isocyanurate, di-, or triallyl cyanurate.

While the alkyl acrylate rubber has been described as containing a core and a graftable overpolymer layer, due to the miscibility of the substantially uncrosslinked alkyl acrylate polymers and the overpolymer, the resulting composition does not necessarily comprise separate identifiable phases as would be observable in a traditional "shell-core" morphology.

A final component of the grafted alkyl acrylate rubber is the grafted hard phase. The grafting reaction is accomplished under well known graft promoting processing conditions. Preferably, the desired grafting polymer is polymerized in an emulsion process in the presence of the previously prepared alkyl acrylate rubber. Suitable grafting conditions are employed to achieve at least some grafting of the hard phase to the alkyl acrylate rubber. Grafting levels measured as a ratio of weight of graft to weight of elastomer phase on the order of 0.01 to about 1.0 are desirable.

The above described components (a) and (b) may be separately prepared in the above described manner and later combined by melt blending, latex blending, or other suitable techniques. Alternatively, at least some of component (a) may be prepared as a result of the grafting polymerization process. As is known to the skilled artisan, quantities of ungrafted matrix polymer are normally prepared in a grafting process. However, additional quantities of separately prepared hard matrix polymer which may be the same or a different composition than the grafted polymer may be blended with the resulting composition.

Additional components, well known to be suitably employed in combination with thermoplastic resins, may be added to the present invented composition. Examples include antioxidants, colorants, pigments, plasticizers, flow aids, fire retardants, fillers, fibers, and structural reinforcing aids. In addition, other well known impact modifying elastomers may be added to the invented composition in order to provide uniquely tailored resultant properties. For example, the presently invented thermoplastic resins may be combined with additional weatherable impact modifiers, such as EP or EPDM rubbers as well as resins or resin blends containing such additional grafted elastomers. Also, conventional crosslinked and grafted acrylate elastomers or resin blends containing such elastomers may be added. The resulting impact and weather resistant thermoplastic according to the invention may be blended with additional thermoplastic matrix polymers such as vinyl chloride homopolymers and copolymers, polyphenylene oxides, polycarbonates, polyesters, aromatic polyester carbonates, and nylons.

The alkyl acrylate rubber may also be agglomerated into larger size particles utilizing previously known agglomeration technology before grafting if desired. Shear or acidification agglomeration techniques and the use of agglomerating agents including electrolytic and polymeric agglomerating agents such as those disclosed in U.S. Pat. No. 4,419,496 are suitable.

The resins of the invention may be molded using injection molding or other suitable thermoplastic molding techniques. The resulting molded objects possess a low gloss surface. Although the surface gloss may be somewhat dependent on the molding temperatures and type and design of the mold, the 60 degree Gardner gloss of objects molded with the resins herein disclosed is consistently less than about 50 percent and often less than about 30 percent.

Having described the invention, the following examples are provided as further illustrative and are not to be construed as limiting. Unless indicated otherwise, parts, percentages and ratios are measured by weight.

EXAMPLE 1

Preparation A; Uncrosslinked Core Rubber

In a one gallon glass pipe reactor was placed 1030 g water, 2.70 g of $NaHCO_3$, 1.80 g $Na_2S_2O_8$, 1.50 g acetic acid, and 13.8 g of a 1000Å butylacrylate seed latex (33 percent active). The contents were purged of oxygen and heated to 65° C. while agitating at 150 RPM. When the temperature reached 65° C., a monomer conadd feed was started consisting of 900 g of n-butylacrylate added at a rate of 180 g/hr for 5 hours. An aqueous feed was added simultaneously at a rate of 135 g/hr for 5.25 hours and consisted of 0.932 percent sodium dodecylbenzene sulfonate soap (NDBS) in water. The latex was heated for 2.0 hours after the monomers had been added and then stabilized with 7.5 g of a 3/1 mixture of dilaurythiodipropinate/topanol CA ® antioxidant mixture. The resulting latex had a particle size of 0.44μ and was about 50 percent soluble (i.e., had a gel content of about 50 percent) in tetrahydrofuran.

Preparation B; High Crosslink Density Overpolymer Shell

Into a glass pipe reactor was placed 2436 g (810 g of rubber solids) of the core rubber latex of preparation A. An additional 100 g $H_2O$ was added to rinse the lines into the reactor. The reactor contents were purged of oxygen and heated to 65° C. while agitating at 150 RPM. A monomer feed consisting of 92.6 g of n-butylacrylate and allylmethacrylate (95/5) was added over a 1 hour period while an aqueous feed consisting of 119.8 g of water (99.0 percent), NDBS (0.74 percent), and $Na_2S_2O_8$ (0.26 percent) was added over a 2 hour period.

The latex was heated for an additional one hour after the aqueous feed had finished. The particle size of the resulting rubber was 4541Å. The gel content was 51 percent, and the swelling index was 31.2 in methyl ethyl ketone (MEK).

Preparation C: SAN Grafted Low Crosslink Density Alkyl Acrylate Rubber

Into a glass pipe reactor was placed 1485 g of the rubber latex prepared in preparation B (500 g rubber solids) and 100 g of water. The contents of the reactor were purged of oxygen and the reactor heated to 80° C. while agitating at 150 RPM. When the contents reached 80° C., an aqueous and a monomer conadd feed were started at the same time. Over a 6 hour period, 500 g of styrene/acrylonitrile (75/25) was added along with 415 g of an aqueous feed consisting of 98.4 percent $H_2O$, 1.20 percent NDBS, and 0.36 percent $Na_2S_2O_8$. The latex was heated for an additional 0.50 hour, steam stripped and stabilized with antioxidants. The resulting grafted alkyl acrylate rubber concentrate was isolated by freeze coagulation and air dried. The product contained 50.8 percent rubber and had a gel content of 51.4 percent in MEK. Because of the significant solubility of the rubber, the ratio of graft to rubber (G/R) oould not be measured, but was estimated to be between about 0.01 and about 0.97.

Testing

Blends of the SAN grafted low crosslink density alkyl acrylate rubber of preparation C and various thermoplastic resins were prepared by compounding the rubber concentrate (RC) with other resins on a 0.8 inch Welding Engineers extruder. Samples were prepared by injection molding on a 2 oz. Negri Bossi injection molding machine (barrel temp 425/450° F., mold temp=110° F.). The 60° Gardner gloss was measured and is reported in Table 1.

TABLE I

| Resin Blend | Ty[1] | E[2] | Impact[3] | Gloss |
|---|---|---|---|---|
| Rovel ® 401 (65.2%)[4] RC (19.7%) SAN 15.1%[6] | 5200 | 67 | 10.3 | 26 |
| BA (27.9%)[5] RC (29.5%) SAN (42.6%)[6] | 4590 | 90 | 6.9 | 21 |

[1]Tensile Yield (lb/in$^2$) ASTM 638 at 0.2 inches/minute
[2]Elongation at Rupture ASTM 638 at 0.2 inches/minute (%)
[3]Notched Izod (ft-lbs/in notch) ASTM D-256
[4]An EPDM rubber-modified SAN resin available from The Dow Chemical Company
[5]A polybutylacrylate rubber-modified SAN resin. The acrylate rubber is a conventional homogeneous, crosslinked, rubber particle of volume average particle size, 0.15μ, and contains 0.40% crosslinker and 1.0% graftlinker. The rubber particles are grafted with SAN. Rubber content is 53.8%.
[6]Tyril ® 111 brand styrene acrylonitrile copolymer available from The Dow Chemical Company.

It is seen that the resin blends of the invention possess good impact resistance and are well suited for the preparation of low gloss molded objects.

What is claimed is:

1. An impact and weather resistant thermoplastic resin comprising: (a) a hard matrix polymer selected from the group consisting of polystyrene; polymethylmethacrylate; an addition polymer of two or more monomers selected from the group consisting of styrene, acrylonitrile, α-methylstyrene and methylmethacrylate; and mixtures thereof, and (b) a grafted alkylacrylate rubber comprising a rubber having a core of a substantially uncrosslinked alkylacrylate polymer having a Tg less than about 0° C., a swelling index in methyl ethyl ketone of greater than 30, a gel content in methyl ethyl ketone of less than about 85 weight percent, and a graftable overpolymer layer of high crosslink density alkylacrylate polymer, said rubber having grafted thereto a polymer selected from the group consisting of polystyrene; polymethylmethacrylate, an addition polymer of two or more monomers selected from the group consisting of styrene, α-methylstyrene, acrylonitrile and methylmethacrylate; and mixtures thereof.

2. A thermoplastic resin according to claim 1, wherein the hard matrix polymer is a copolymer of styrene and acrylonitrile.

3. A thermoplastic resin according to claim 1, wherein the rubber core comprises a homopolymer of butylacrylate.

4. A thermoplastic resin according to claim 1, wherein the graftable overpolymer layer contains from about 0.1 to about 10 weight percent of one or more polymerized graftlinking or crosslinking monomers.

5. A thermoplastic resin according to claim 4, wherein the graftlinking or crosslinking monomer is allylacrylate, allylmethacrylate or diallylmaleate.

6. A thermoplastic resin according to claim 1, wherein the grafted alkylacrylate rubber has a copolymer of styrene and acrylonitrile grafted thereto.

7. A thermoplastic resin according to claim 1 additionally comprising an EPDM rubber elastomer.

8. A thermoplastic resin according to claim 1 additionally comprising a crosslinked and grafted acrylate elastomer.

* * * * *